(12) United States Patent
Van Lunteren

(10) Patent No.: US 10,996,949 B2
(45) Date of Patent: May 4, 2021

(54) ADDRESS GENERATION FOR HIGH-PERFORMANCE VECTOR PROCESSING

(71) Applicant: International Business Machines Corporation, Armonk, NY (US)

(72) Inventor: Jan Van Lunteren, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/408,575

(22) Filed: May 10, 2019

(65) Prior Publication Data
US 2020/0356367 A1    Nov. 12, 2020

(51) Int. Cl.
*G06F 9/30*     (2018.01)
*G06F 12/06*    (2006.01)

(52) U.S. Cl.
CPC ...... *G06F 9/30036* (2013.01); *G06F 9/30029* (2013.01); *G06F 9/30032* (2013.01); *G06F 12/0607* (2013.01)

(58) Field of Classification Search
CPC ...... G06F 12/0607; G06F 12/06; G06F 12/02; G06F 12/0207; G06F 12/0223; G06F 12/0292; G06F 12/0646; G06F 12/0653; G06F 12/0661; G06F 12/0669; G06F 12/0676; G06F 9/30036; G06F 9/30029; G06F 9/30032; G06F 9/3455
See application file for complete search history.

(56) References Cited

U.S. PATENT DOCUMENTS

| | | | |
|---|---|---|---|
| 6,453,380 B1 * | 9/2002 | Van Lunteren | G06F 12/0607 711/157 |
| 6,604,166 B1 | 8/2003 | Jana et al. | |

(Continued)

FOREIGN PATENT DOCUMENTS

| | | |
|---|---|---|
| CN | 104699465 A | 6/2015 |
| CN | 104699465 B | 5/2017 |

(Continued)

OTHER PUBLICATIONS

Gonzalez, et. al, "Eliminating Cache Conflict Misses Through XOR-Based Placement Functions," 1997, ACM Inc., pp. 76-83 (Year: 1997).*

(Continued)

*Primary Examiner* — Michael Krofcheck
(74) *Attorney, Agent, or Firm* — Harrington & Smith

(57) ABSTRACT

A method for accessing a binary data vector in a memory unit comprising a plurality of memory banks in which the binary data vector is stored in portions includes receiving a start address of the binary data vector and a power-of-2-stride elements of the data vector and determining offsets, wherein the offsets are determined by applying a plurality of bit-level XOR functions to the start address resulting in a Z vector, using the Z vector for accessing a mapping table, and shifting mapping table access results according to a power-of-2-stride of the binary data vector. Additionally, the method includes determining a sequence of portions of the binary data vector in the n memory banks depending on a binary equivalent value of the Z vector, and accessing the binary data vector in the n memory banks of the memory unit in parallel.

23 Claims, 13 Drawing Sheets

(56) References Cited

U.S. PATENT DOCUMENTS

| | | | |
|---|---|---|---|
| 7,398,362 B1* | 7/2008 | Tischler | G06F 12/0607 |
| | | | 711/157 |
| 7,793,038 B2 | 9/2010 | Blumrich et al. | |
| 7,996,597 B1* | 8/2011 | Venkatramani | G06F 13/1626 |
| | | | 711/5 |
| 8,074,010 B2 | 12/2011 | Hutson | |
| 9,582,420 B2 | 2/2017 | Van Lunteren | |
| 9,705,532 B2 | 7/2017 | Kharkunou | |
| 2014/0025908 A1* | 1/2014 | Sharma | G06F 12/0607 |
| | | | 711/157 |
| 2016/0275013 A1* | 9/2016 | Van Lunteren | G06F 12/0607 |

FOREIGN PATENT DOCUMENTS

| | | |
|---|---|---|
| EP | 1016970 A2 | 7/2000 |
| EP | 1016970 A3 | 6/2001 |
| JP | 2000231513 A | 8/2000 |

OTHER PUBLICATIONS

International Search Report, Application No. PCT/IB2020/054137 dated Aug. 17, 2020, 9 pages.

\* cited by examiner

| OFFSET | BANK 0 | BANK 1 | BANK 2 | BANK 3 | BANK 4 | BANK 5 | BANK 6 | BANK 7 |
|---|---|---|---|---|---|---|---|---|
| 27 | 27 | 91 | 155 | 219 | 283 | 347 | 411 | 475 |
| 26 | 90 | 26 | 218 | 154 | 346 | 282 | 474 | 410 |
| 25 | 153 | 217 | 25 | 89 | 409 | 473 | 281 | 345 |
| 24 | 216 | 152 | 88 | 24 | 472 | 408 | 344 | 280 |
| 23 | 343 | 279 | 471 | 407 | 87 | 23 | 215 | 151 |
| 22 | 278 | 342 | 406 | 470 | 22 | 86 | 150 | 214 |
| 21 | 469 | 405 | 341 | 277 | 213 | 149 | 85 | 21 |
| 20 | 404 | 468 | 276 | 340 | 148 | 212 | 20 | 84 |
| 19 | 83 | 19 | 211 | 147 | 339 | 275 | 467 | 403 |
| 18 | 18 | 82 | 146 | 210 | 274 | 338 | 402 | 466 |
| 17 | 209 | 145 | 81 | 17 | 465 | 401 | 337 | 273 |
| 16 | 144 | 208 | 16 | 80 | 400 | 464 | 272 | 336 |
| 15 | 399 | 463 | 271 | 335 | 143 | 207 | 15 | 79 |
| 14 | 462 | 398 | 334 | 270 | 206 | 142 | 78 | 14 |
| 13 | 269 | 333 | 397 | 461 | 13 | 77 | 141 | 205 |
| 12 | 332 | 268 | 460 | 396 | 76 | 12 | 204 | 140 |
| 11 | 139 | 203 | 11 | 75 | 395 | 459 | 267 | 331 |
| 10 | 202 | 138 | 74 | 10 | 458 | 394 | 330 | 266 |
| 9 | 9 | 73 | 137 | 201 | 265 | 329 | 393 | 457 |
| 8 | 72 | 8 | 200 | 136 | 328 | 264 | 456 | 392 |
| 7 | 455 | 391 | 327 | 263 | 199 | 135 | 71 | 7 |
| 6 | 390 | 454 | 262 | 326 | 134 | 198 | 6 | 70 |
| 5 | 325 | 261 | 453 | 389 | 69 | 5 | 197 | 133 |
| 4 | 260 | 324 | 388 | 452 | 4 | 68 | 132 | 196 |
| 3 | 195 | 131 | 67 | 3 | 451 | 387 | 323 | 259 |
| 2 | 130 | 194 | 2 | 66 | 386 | 450 | 258 | 322 |
| 1 | 65 | 1 | 193 | 129 | 321 | 257 | 449 | 385 |
| 0 | 0 | 64 | 128 | 192 | 256 | 320 | 384 | 448 |

900

| 63 | 63 | 127 | 191 | 255 | 319 | 383 | 447 | 511 |
|---|---|---|---|---|---|---|---|---|
| 9 | 9 | 73 | 137 | 201 | 265 | 329 | 393 | 457 |
| 8 | 72 | 8 | 200 | 136 | 328 | 264 | 456 | 392 |
| 7 | 455 | 391 | 327 | 263 | 199 | 135 | 71 | 7 |
| 6 | 390 | 454 | 262 | 326 | 134 | 198 | 6 | 70 |
| 5 | 325 | 261 | 453 | 389 | 69 | 5 | 197 | 133 |
| 4 | 260 | 324 | 388 | 452 | 4 | 68 | 132 | 196 |
| 3 | 195 | 131 | 67 | 3 | 451 | 387 | 323 | 259 |
| 2 | 130 | 194 | 2 | 66 | 386 | 450 | 258 | 322 |
| 1 | 65 | 1 | 193 | 129 | 321 | 257 | 449 | 385 |
| 0 | 0 | 64 | 128 | 192 | 256 | 320 | 384 | 448 |
|   | BANK 0 | BANK 1 | BANK 2 | BANK 3 | BANK 4 | BANK 5 | BANK 6 | BANK 7 |

FIG.9

| | BANK 0 | BANK 1 | BANK 2 | BANK 3 | BANK 4 | BANK 5 | BANK 6 | BANK 7 |
|---|---|---|---|---|---|---|---|---|
| 63 | 63 | 127 | 191 | 255 | 319 | 383 | 447 | 511 |
| 59 | 315 | 379 | 443 | 507 | 59 | 123 | 187 | 251 |
| 51 | 371 | 307 | 499 | 435 | 115 | 51 | 243 | 179 |
| 43 | 427 | 491 | 299 | 363 | 171 | 235 | 43 | 107 |
| 35 | 483 | 419 | 355 | 291 | 227 | 163 | 99 | 35 |
| 27 | 27 | 91 | 155 | 219 | 283 | 347 | 411 | 475 |
| 19 | 83 | 19 | 211 | 147 | 339 | 275 | 467 | 403 |
| 11 | 139 | 203 | 11 | 75 | 395 | 459 | 267 | 331 |
| 3 | 195 | 131 | 67 | 3 | 451 | 387 | 323 | 259 |
| 0 | 0 | 64 | 128 | 192 | 256 | 320 | 384 | 448 |

FIG. 10

ADDRESS GENERATION FOR HIGH-PERFORMANCE VECTOR PROCESSING

BACKGROUND

Field of the Invention

The exemplary embodiments described herein relate generally to an efficient memory access, and more specifically, to a method for accessing a binary data vector in a memory unit comprising a plurality of memory banks in which the binary data vector is stored in portions. The exemplary embodiments relate further to a related memory access unit for accessing a binary data vector in a memory unit comprising a plurality of n memory banks in which the binary data vector is stored in portions, and a computer program product.

Technical Field

Many workloads and modern computing are based relying on basic processing steps that apply identical operations and are sequences of operations upon large amounts of data. The main challenge for realizing high performance for those workloads typically relates to getting the data in the most efficient way from the memory system to the execution units, and getting the processing results from the execution units back to the memory system.

The processing required by many of those workloads are often a combination of multiplications and additions on either floating-point or integer values. For example, the core processing of deep learning (both, training and interference) workloads are based on applying massive amounts of matrix-multiplication operations on input and/or training data. Stencil codes form the core of many models that are used for applications such as weather prediction, searching for oil and gas, and so on. These stencil codes iteratively update error rate elements according to a fixed pattern, called a stencil, usually involving some weighted sum of the values of the neighboring elements. The FFT (Fast Fourier Transformation) is one of the most widely used algorithms in science and engineering and is based on calculating very large numbers of so-called butterfly computations which each are based on multiplications and additions. Both, stencil computation and FFTs are also used for particular deep learning algorithms (e.g., convolutional neural networks, CNN).

To obtain high performance, the execution units (typically involving a combination of multipliers and adders) are often organized as vector (SIMD, single instruction, multiple data) units that apply the same operations or combinations of operations many times in parallel on input data that is provided as a stream of wide data vectors.

Retrieving a data vector from the memory system which includes all required operand values for the processing elements that make up the vector unit is often not straightforward because of so-called power-of-2 strides in the address sequences that are needed to read those operand values. This type of access patterns, for example, occur for workloads that access data structures that are mapped on a linear virtual or physical address space, by addresses with an increment of 1 (e.g., 0, 1, 2, 3, etc.), 8 (e.g., 0, 8, 16, 24, etc.), or 256 (e.g., 0, 256, 512, 768, 1024, etc.) and so on.

There are several disclosures related to a method for accessing a binary data vector in a memory unit comprising a plurality of n memory banks in which the binary data vector is stored in portions.

Document U.S. Pat. No. 9,705,532 B2 discloses a method and a system for a parallel accumulation of information bits as part of the generation of low-density parity-check codes. Thereby, consecutive information bits can be accumulated through vector operations, wherein the parity address used for accumulations can be made continuous through virtual and private parity address mapping.

Document U.S. Pat. No. 7,793,038 B2 discloses a mapping of an address for a memory access in a memory system into a combination address that includes a memory bank identifier and a memory bank internal address. The address is partitioned into a first portion and a second portion. Additionally, the memory bank identifier is determined by performing a look-up operation in a look-up matrix.

However, a disadvantage of known solutions continues to be the problem that for many applications, data vectors need to be constructed in a variety of ways involving multiple different power-of-2strides in the address sequences that are used to access the data vector elements. For example, at one moment a data vector can be composed of data elements that relate to an address sequence involving a stride 1, at other times a data vector can be composed from data elements that relate to an address sequence involving a stride 8, and so on. Because the same data elements are combined in a variety of ways with other data elements to form data vectors, it becomes much more difficult to ensure that all data elements that will be used to form a data vector, are stored in distinct banks so that all data elements that make up one data vector can be read in parallel from those banks in one principle cycle of the underlying hardware. The herein proposed concepts address this problem.

SUMMARY

According to one aspect, a method for accessing a binary data vector in a memory unit comprising a plurality of n memory banks in which the binary data vector is stored in portions may be provided. The method comprises receiving a start address of the binary data vector and a power-of-2-stride s for elements of the binary data vector and determining n offsets, one for each of the memory banks, where each of the offsets is determined by applying a plurality of bit-level XOR functions to the start address resulting in a Z vector, using the Z vector for accessing a mapping table, and shifting mapping table access results according to a power-of-2-stride of the binary data vector.

Furthermore, the method comprises determining a sequence of portions of the binary data vector in the n memory banks depending on a binary equivalent value of the Z vector, and accessing the binary data vector in the n memory banks of the memory unit in parallel.

According to another aspect, a memory access unit for accessing a binary data vector in a memory unit comprising a plurality of n memory banks in which the binary data vector may be stored in portions may be provided. The memory access unit comprises a receiving unit adapted for receiving a start address of the binary data vector and a power-of-2-stride s for elements of the binary data vector, and a first determination module adapted for determining n offsets, one for each of the memory banks, where each of the offset is determined by applying a plurality of bit-level XOR functions to the start address resulting in a Z vector, using the Z vector for accessing a mapping table, and shifting mapping table access results according to a power-of-2-stride of the binary data vector.

Additionally, the memory access unit comprises a second determination module adapted for determining a sequence of portions of the binary data vector in the n memory banks depending on a binary equivalent value of the Z vector, and a basic access unit adapted for accessing the binary data vector in the n memory banks of the memory unit in parallel.

The proposed method for accessing a binary data vector in a memory unit comprising a plurality of n memory banks in which the binary data vector is stored in portions may offer multiple advantages and technical effects:

It may principally allow to address also large or long data vectors—in particular for matrix operations like multiplications, and the like—"in one go", i.e., basically in one operation cycle of a memory system. This may become possible because no overlapping addressing may be required. The data values of different dimensions of a high dimensional vector may always be distributed across different memory banks of a memory system or memory unit. Thus, by addressing the different memory banks and within a memory bank one particular data value of one dimension of the high dimensional vector, the shortest possible access time to all values of a vector becomes possible.

Thus, the situation may be avoided, in which two or more accesses to the same memory bank may be required in order to address different data values of different dimensions of the same hyper dimensional vector. This may clearly save operating cycles of the memory unit and thus the related computing system. Therefore, by the here proposed concept, a significant performance advantage may be achieved if compared to prior-art techniques for accessing data vectors in a memory system/unit.

The proposed concept also enables a way of shuffling the data elements of the vector when writing to the memory banks as well as a back-shuffling the data elements when reading the data of the vector. Thus, after a write-read cycle, the data elements of the vector are again well sorted as before the write operation to the memory unit/system.

Furthermore, due to current trends in computer system design, the access to data in memory and the corresponding transfer become dominating factors impacting system-level performance for many applications. By improving the speed at which data vectors that can be very efficiently processed by state-of-the-art vector units can be accessed in memory, the embodiments described herein may help to substantially improve the performance of computer systems for a range of workloads.

In the following, additional embodiments of the inventive concept will be described.

According to one preferred embodiment of the method, the applying a plurality of bit-level XOR functions to the start address may comprise selecting from the start address—in particular the address of a first element of the vector in a linear address room of a CPU—$\log_2(n)$ portions and a Y portion of $\log_2(n)$ bit size, determining a parity bit for each of the $\log_2(n)$ portions resulting in a parity vector X of $\log_2(n)$ dimensions—i.e., a group of individual bits—and performing bit-level XOR operations between X and Y resulting in a Z vector. Thereby, it may be mentioned that the $\log_2(n)$ portions and the Y portion may be selectable by address masks—in particular, by $\log_2(n)+1$ by address masks. Details of this shuffling operation will become clearer in combination when describing the figures below.

According to one useful embodiment of the method, using the Z vector for accessing a mapping table may also comprise selecting a row in the mapping table comprising $\log_2(n)$ entries by using the Z vector—in particular its binary equivalent value—as index in the mapping table, and combining—also denotable as 'merging'—the mapping table access results with a portion of the start address to obtain the n offsets. Details will be explained below in the context of the figures.

According to one advantageous embodiment of the method, the combining may comprise replacing $\log_2(n)$ bits located at bit offset $\log_2(s)$ of the start address by the determined $\log_2(n)$ mapping table entries resulting in $\log_2(n)$ offsets. Thereby, each one may be used as offset in a respective one of the $\log_2(n)$ banks. This may allow a straightforward determination with only very limited overhead.

According to one additionally preferred embodiment of the method, the determining the sequence of portions—a process which may also be denoted as shuffling—of the binary data vector in the n memory banks may comprise controlling $\log_2(n)$ consecutive multiplexer stages, each of which comprising a plurality of 2-input-bit-multiplexers so as to cover the total width of the data vector. This may allow a positioning of individual data values of a high dimensional vector so that no overlapping addresses may be required.

More particularly, the first multiplexer stage may swap the most significant part of the data vector with the least significant part in case the corresponding Z vector bit equals one. The second multiplexer stage may apply the same function in parallel on the lower and upper parts of the data vector under control of the second Z vector bit, and so on. These $\log_2(n)$ multiplexer stages may be used to swap the various data elements that will be written to, respectively read, from the memory banks at the correct locations.

According to one permissive embodiment of the method, the access operation may be a read operation. Alternatively, or in combination, the access operation may be a write operation. Thus, also delete operations are usable as part of the inventive concept. Hence, all operations in a memory unit, a memory device of the individual memory banks may be performed using the here proposed concept. A difference may be in the sequence of the address generation or a reshuffling of the identified data elements of a larger—e.g., hyper dimensional—vector.

According to one practical embodiment of the method, the selected $\log_2(n)$ portions of the start address may be equally sized. This may be equally performed under the power-of-2-stride concept.

According to another practical embodiment of the method, the binary data vector may be stored in equally sized portions in the plurality of the n memory banks. Thus, an equal distribution of data elements may consequently be achieved.

According to one embodiment of the method, in which a write operation to the memory banks is covered, the providing the start address, the determining the offsets, and the determining a sequence of portions of the binary data vector (i.e., portion of the main concept) and the determining a sequence of portions (i.e., the shuffling) may be performed before the write operation of the binary data vector to the n memory banks. This may guarantee storing of the dimensional values of the vector for a fast write operation requiring basically only one cycle of the memory unit and in order to allow a "mirrored" read operation to the data.

According to one consequent embodiment of the method, the providing the start address, the determining the offsets, and the determining a sequence of portions of the binary data vector (see the main concept) may be performed before the read operation of the binary data vector to the n memory banks, and where the determining a sequence of portions (i.e., the shuffling) may be performed after the read operation of the binary data vector to the n memory banks. This step may be required in order to bring the data values of the large or hyper dimensional vector back into the original sequence.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects, are apparent from the examples of embodiments to be described hereinafter and are explained with reference to the examples of embodiments, but to which the embodiments are not limited.

Figure 1:
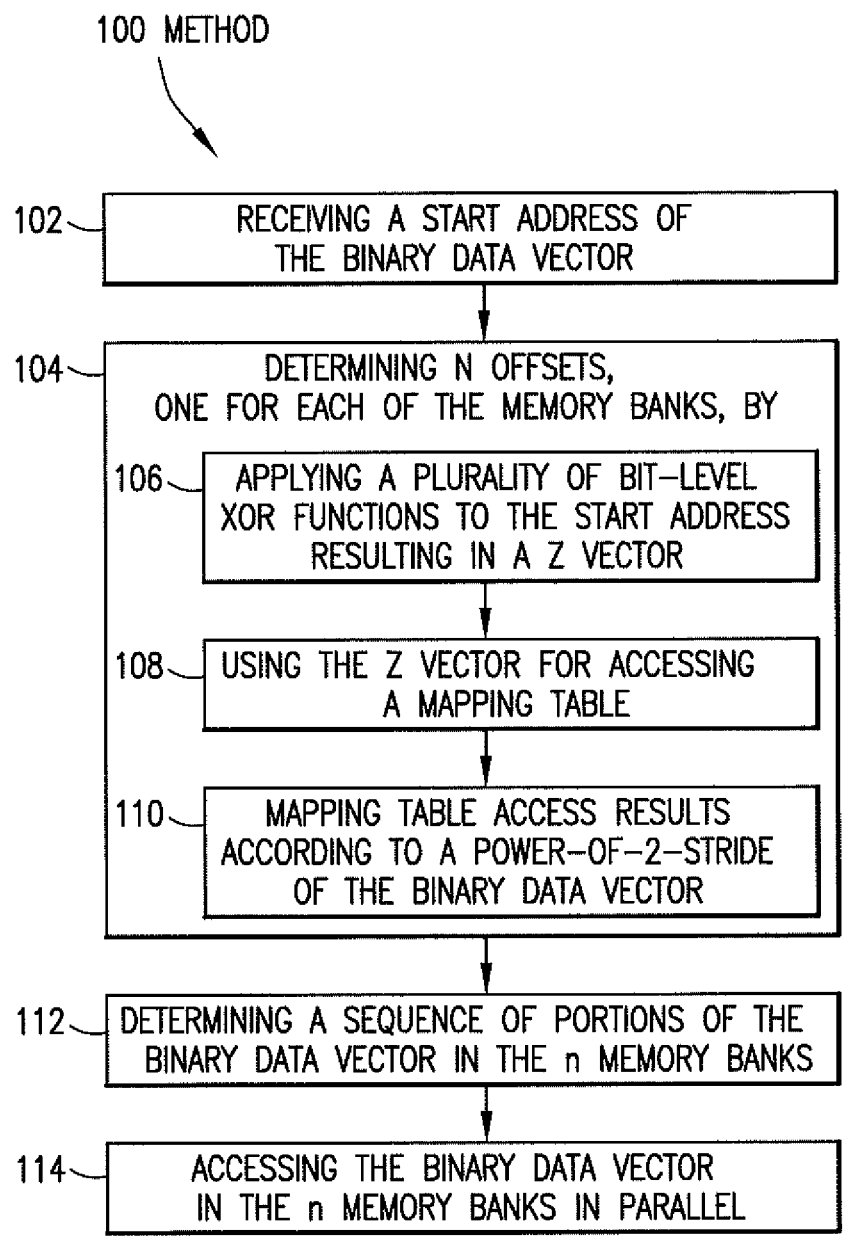

Preferred embodiments will be described, by way of example only, and with reference to the following drawings:

FIG. 1 shows a block diagram of a base embodiment of the inventive method for accessing a binary data vector in a memory unit comprising a plurality of n memory banks in which the binary data vector is stored in portions.

Figure 2:
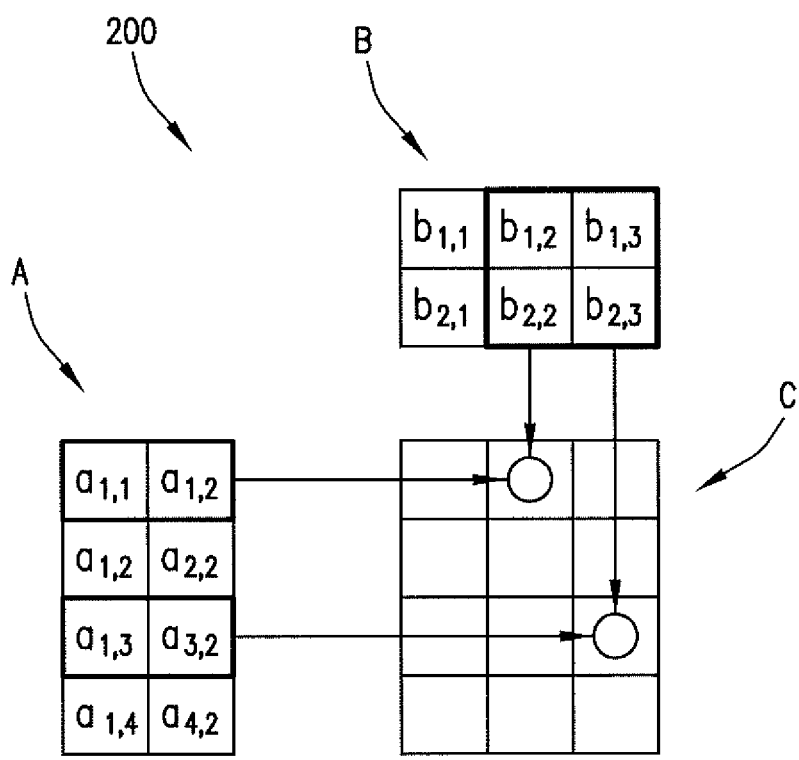

FIG. 2 illustrates a difficult memory addressing scheme required for typical matrix modifications.

Figure 3:
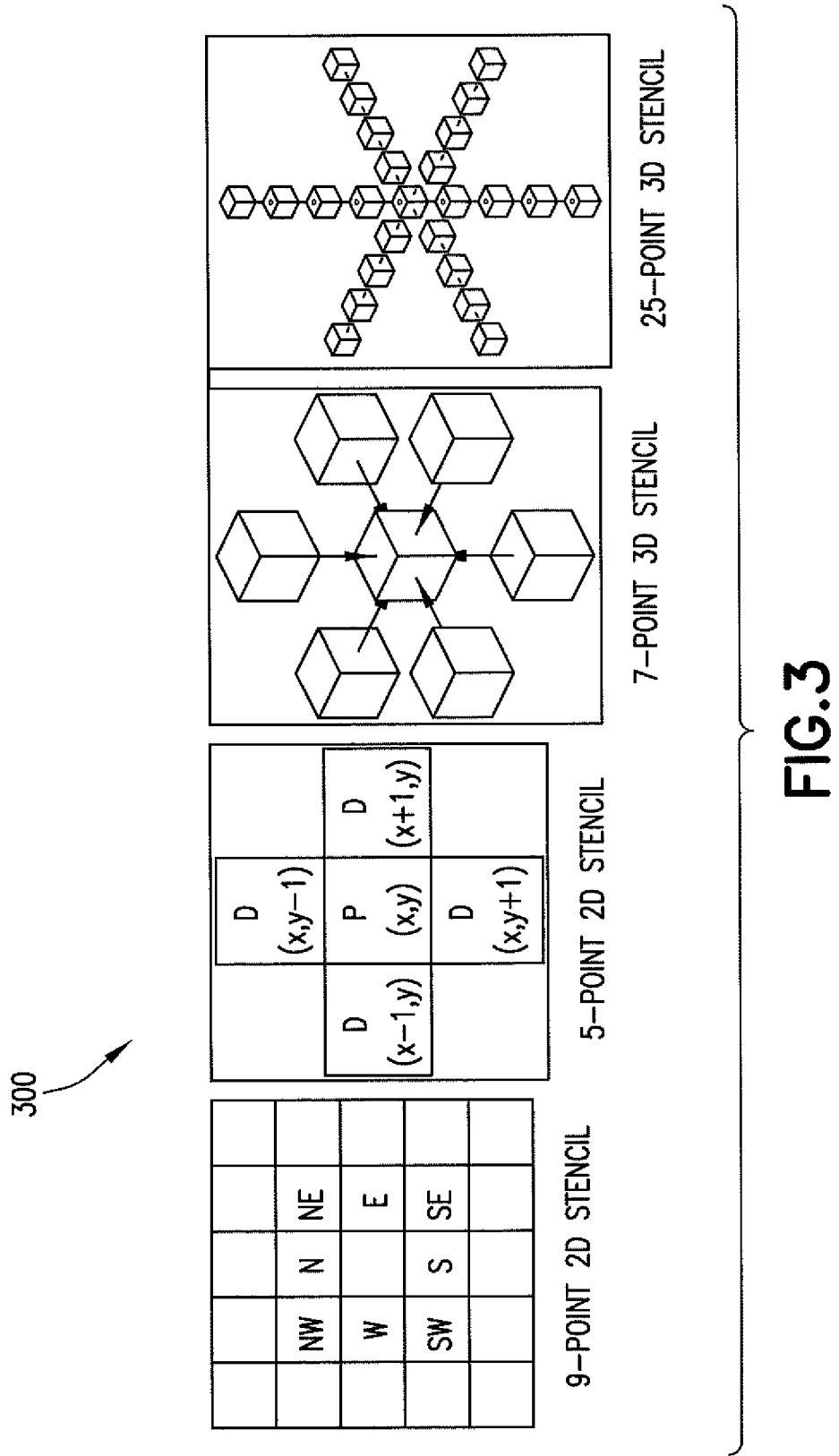

FIG. 3 shows another application area for the proposed concept.

Figure 4:

FIG. 4 shows an embodiment of an exemplary mapping.

Figure 5:
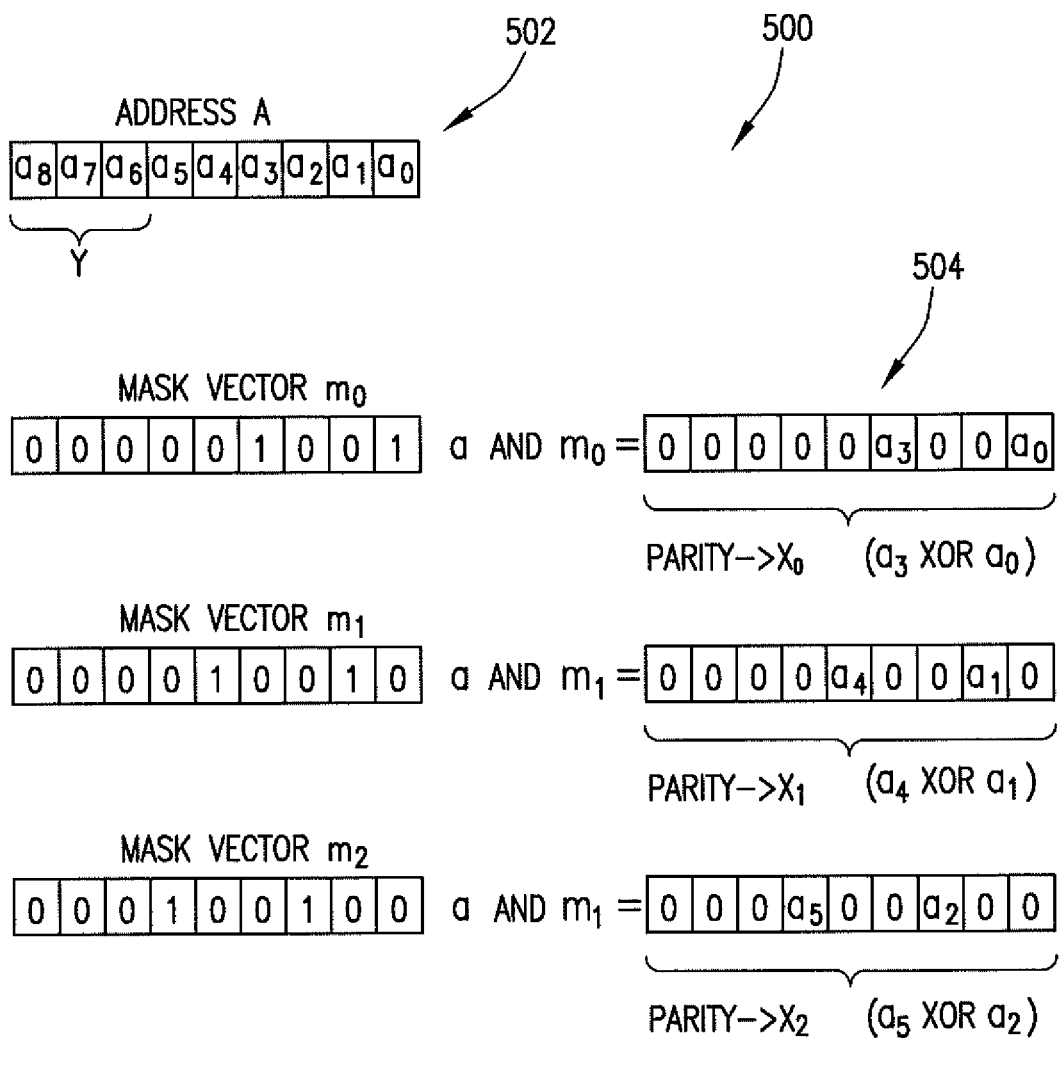

FIG. 5 shows an example for a start address for a data vector having 9 bit elements.

Figure 6:
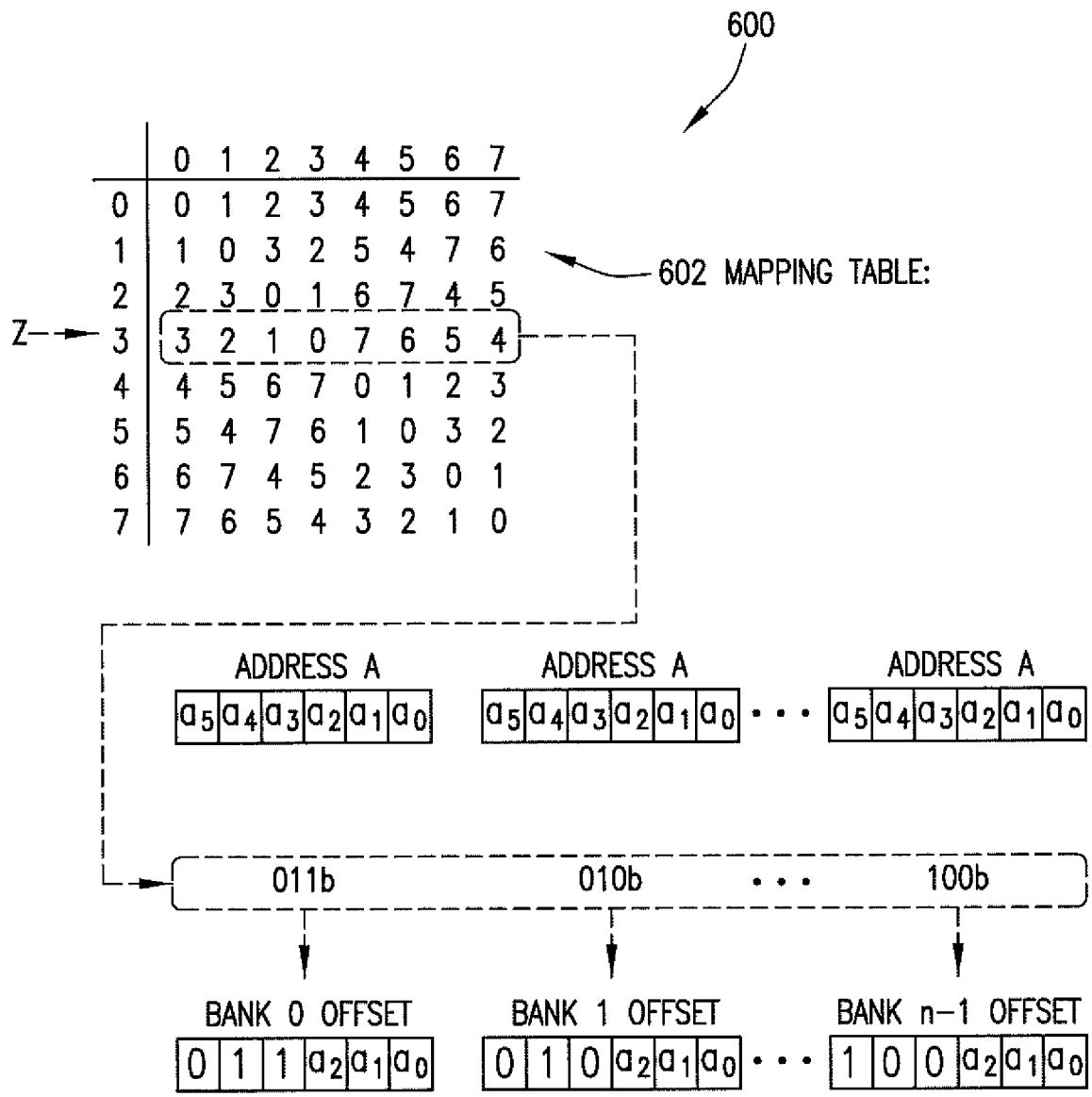

FIG. 6 shows an embodiment of an exemplary mapping table and a next step in determining the offsets for the memory banks in the memory unit.

Figure 7:
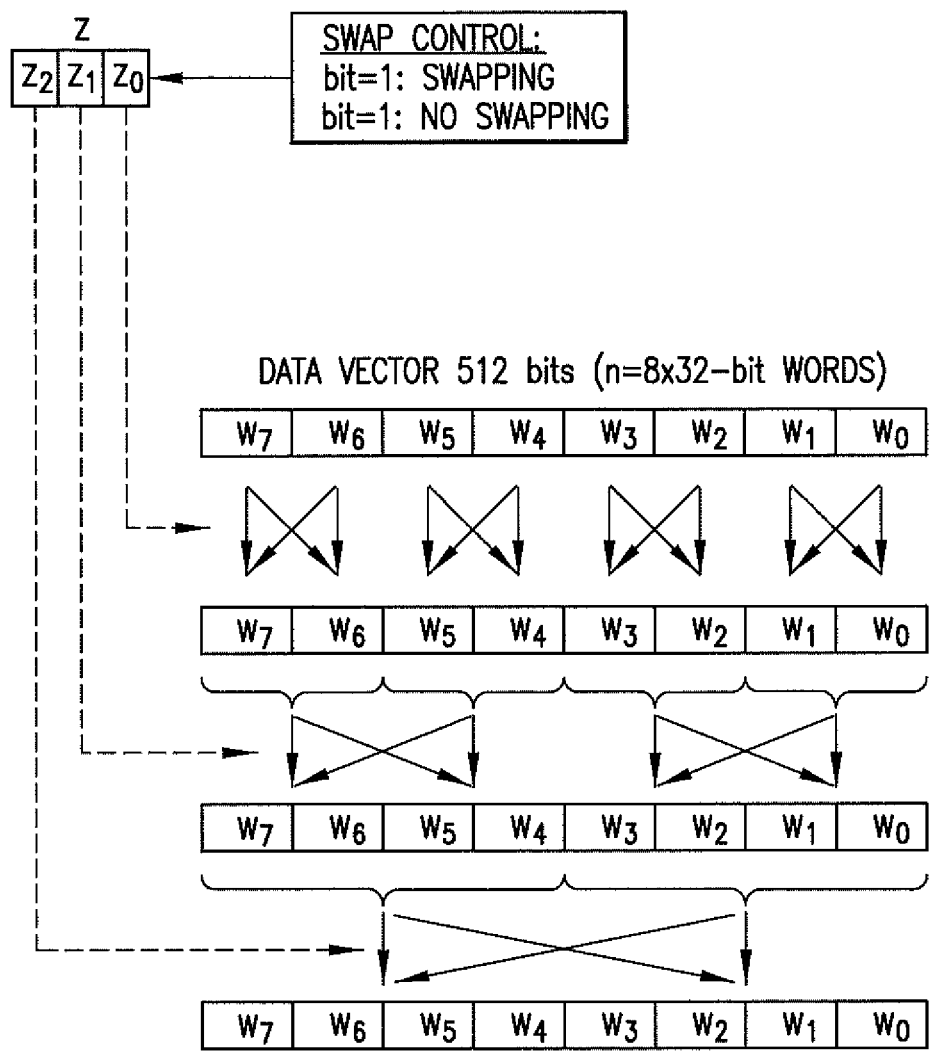

FIG. 7 shows how a shuffling of the entries in the memory banks may be determined.

Figure 8:
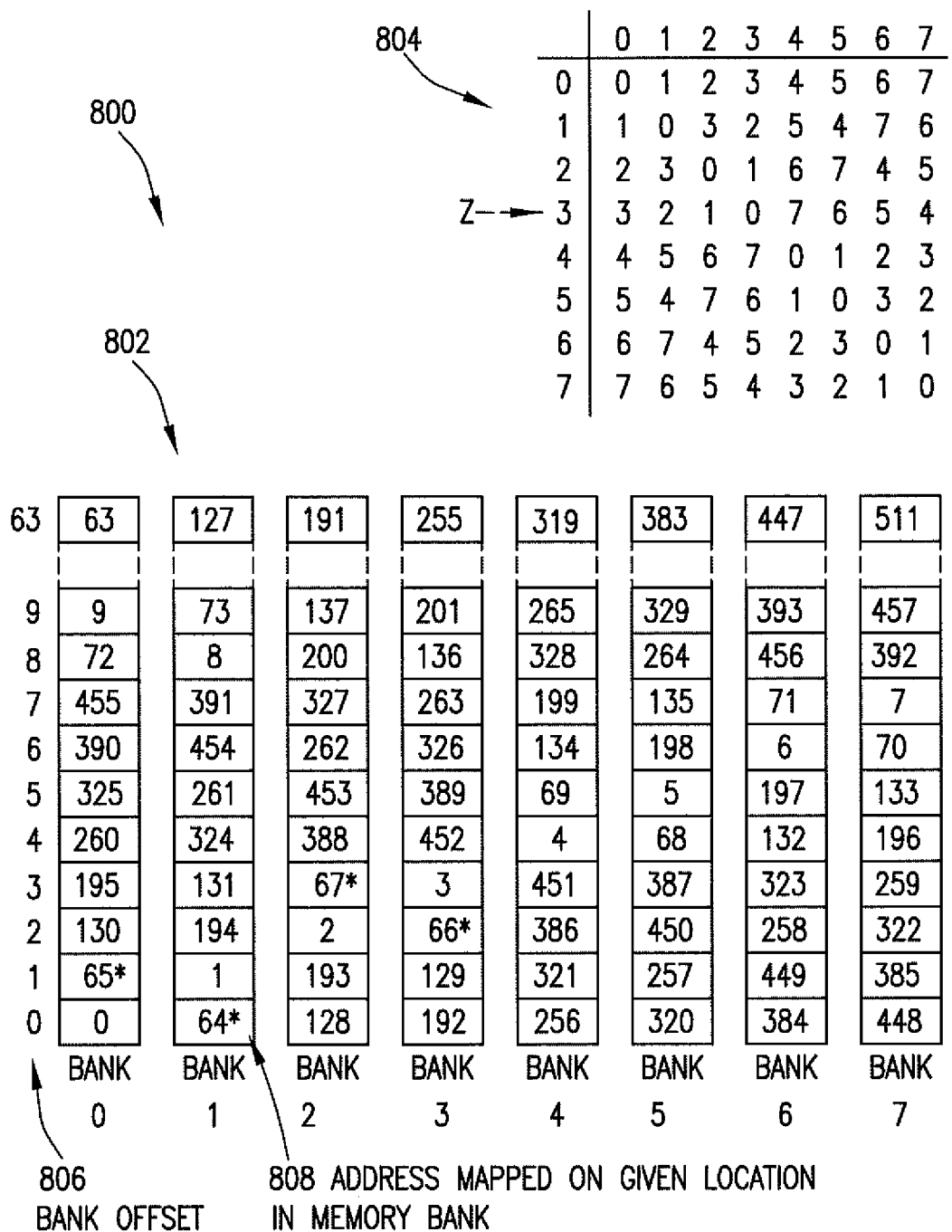

FIG. 8 illustrates exemplarily 8 banks representing the memory unit.

FIG. 9 shows as example as vector start address 256, stride 1.

FIG. 10 shows as example as vector start address 3, stride 8.

Figure 11:
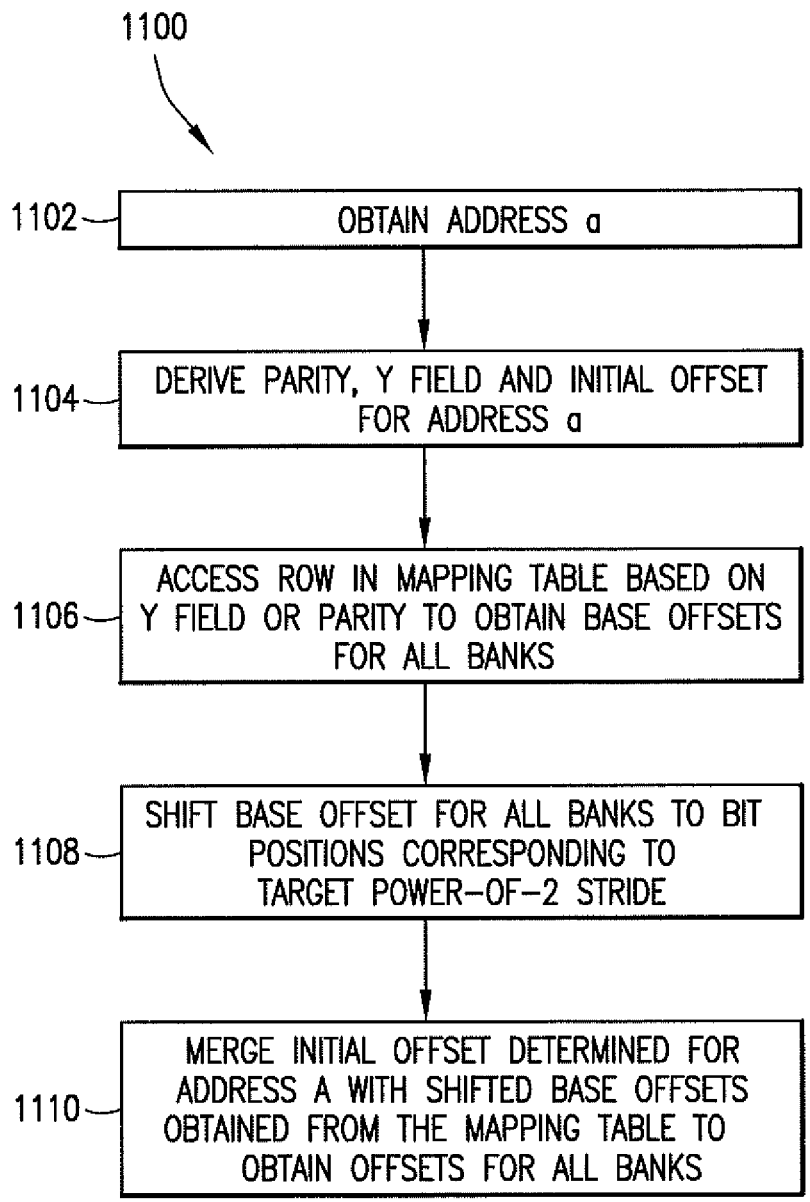

FIG. 11 shows a more implementation near flow-chart of a read process according to the proposed base concept.

Figure 12:
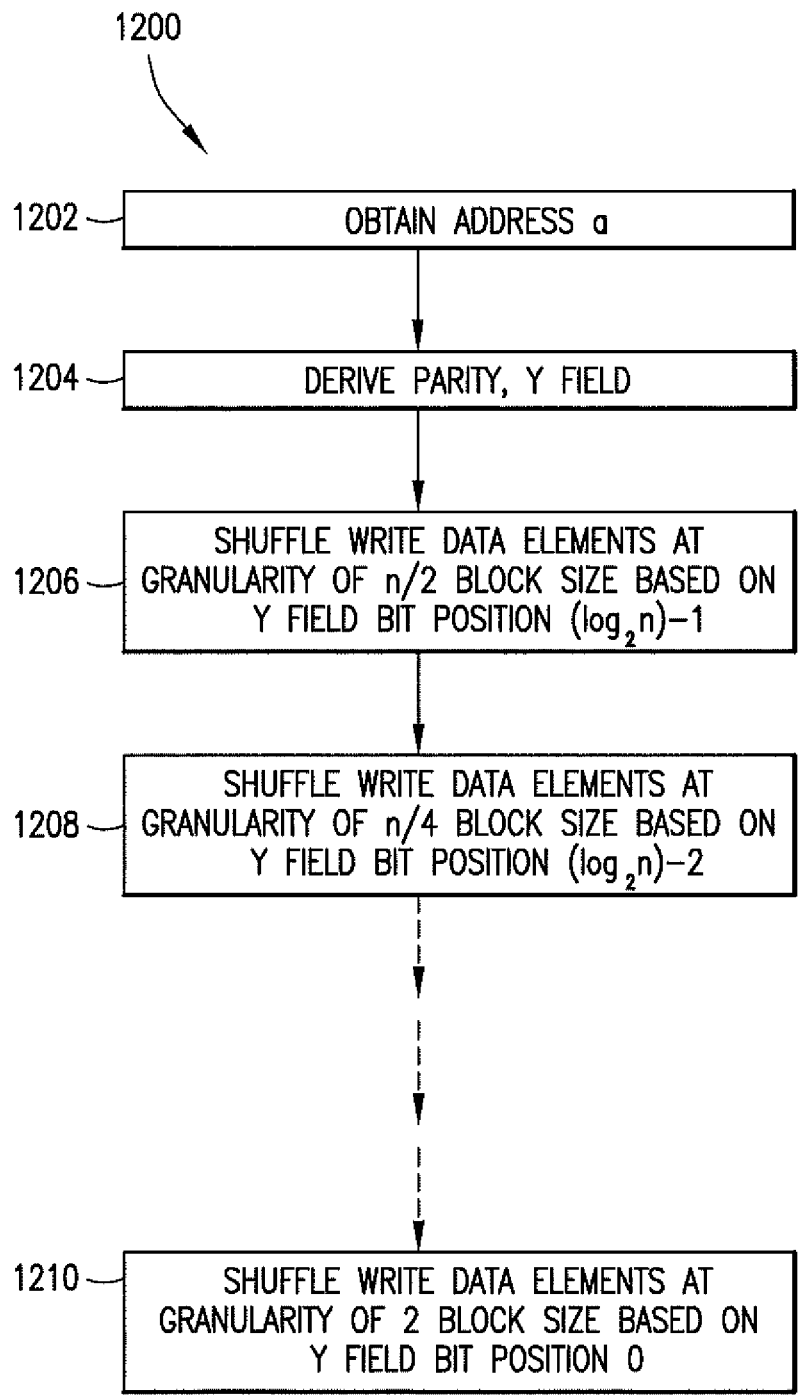

FIG. 12 shows a more implementation near flow-chart of a read process according to the proposed base concept.

Figure 13:
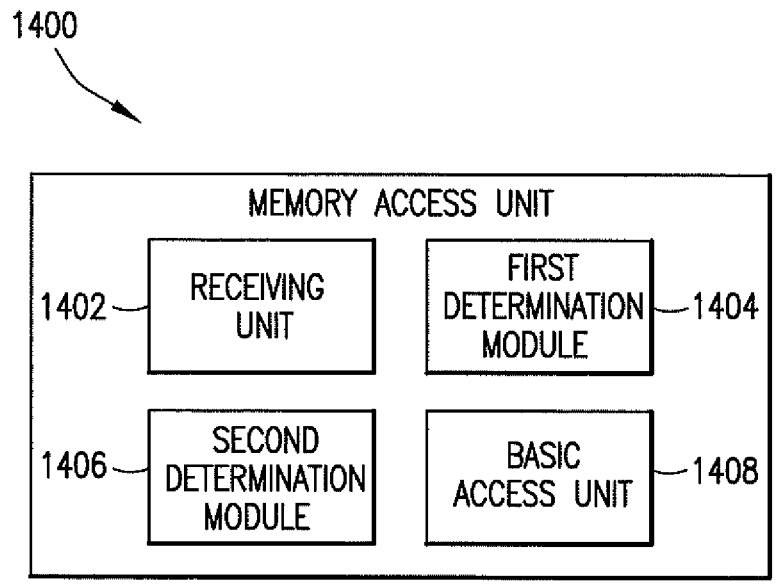

FIG. 13 shows a block diagram of a memory access unit for a binary vector in a memory unit comprising a plurality of banks.

Figure 14:
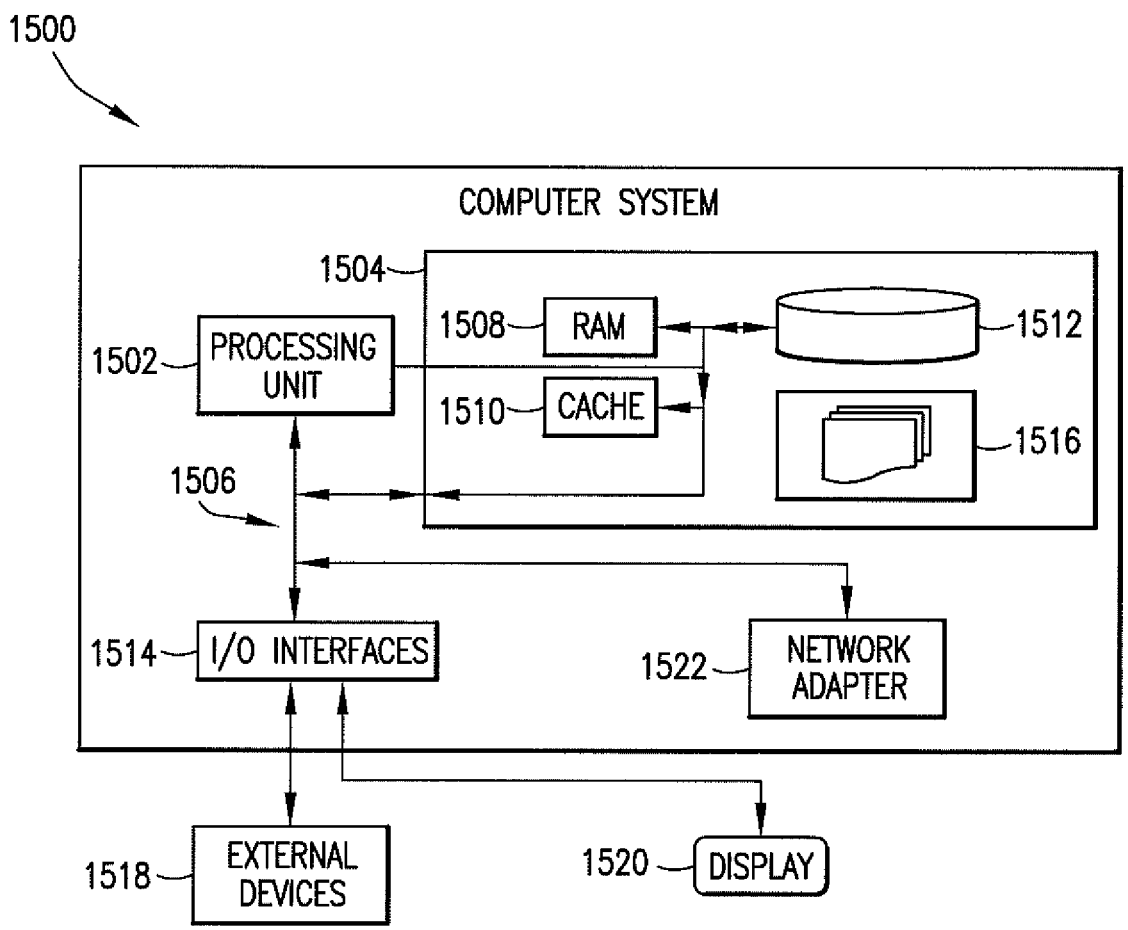

FIG. 14 shows a block diagram of a computer system in which the memory access unit can be used.

DETAILED DESCRIPTION

In the context of this description, the following conventions, terms and/or expressions may be used:

The term 'binary data vector' may denote a field of values (e.g., bit values, integer values, float values, a character field or the like) to be addressed as words of sequences of bits in a memory system of a computer. Such memory systems may typically be the RAM (random access memory). Depending on the word length at a given address, a predefined number of bits may be stored in a word of the memory system on memory unit (both forms may be used as synonyms throughout the complete text).

The term 'memory unit' may denote a larger storage module of a computer system which may be partitioned into a plurality of banks. Each bank may have a predefined number of storage cells being organized in individually addressable words of a certain size. The memory banks of the memory unit banks may be addressable individually, and in each memory bank, individual words may be addressed.

The term 'memory banks' may denote a group of storage cells which plurality defines a larger group of storage cells to be accessible via a bank address. Within each bank a plurality of individual memory cells, organized as words, may be individually addressed. Typically, a memory unit comprises a plurality of memory banks.

The term 'start address of the binary data vector' may typically denote the address of a first (or 0-th) element of a long binary data vector.

The term 'power-of-2 stride' may denote a sequence of elements being separated by $2^n$ elements in between. If n=0, the following elements may be addressed: 0, 1, 2, 3, . . . because $2^0=1$. If n=1, the following elements may be addressed: 0, 2, 4, 6, . . . because $2^n=1$, and so on.

The term 'Z vector' may denote a vector with a size of log 2(n) bits that is obtained by applying a plurality of bit-level XOR functions to the address.

The term 'mapping table' may denote a table comprising as many columns as the number of banks contained in the memory unit. The elements in the table may be integer values ranging from zero to the number of banks minus 1.

In the following, a detailed description of the figures will be given. All instructions in the figures are schematic. Firstly, a block diagram of an embodiment of the inventive method for accessing a binary data vector in a memory unit comprising a plurality of n memory banks in which the binary data vector is stored in portions is given. Afterwards, further embodiments, as well as embodiments of the memory access unit for accessing a binary data vector in a memory unit comprising a plurality of n memory banks in which the binary data vector is stored in portions, will be described.

FIG. 1 shows a block diagram of an embodiment of the method for accessing a binary data vector in a memory unit comprising a plurality of n memory banks in which the binary data vector is stored in portions.—As a mental reference model for the following examples one may imagine that the binary data vector is 256 bit long and that the memory unit has eight banks, a width of 32 bits for each bank, and a bank size of 64 locations.

The method comprises receiving, 102, a start address of the binary data vector—in particular, a start address of an array in the address space of the CPU—and a power-of-2-stride s for the elements of the binary data vector.

The method comprises also determining, 104, n offsets, one for each of the memory banks. Thereby, the each of the offsets is determined, 106, by applying a plurality of bit-level XOR functions to the start address resulting in a Z vector, using, 108, the Z vector for accessing a mapping table, and shifting, 110, mapping table access results according to a power-of-2-stride of the binary data vector.

Additionally, the method comprises determining, 112, a sequence of portions of the binary data vector in the n memory banks depending on the binary equivalent value of the Z vector, and accessing, 114, the binary data vector in the n memory banks in parallel—in particular, in one operation cycle or simultaneously—of the memory unit.

FIG. 2 illustrates, at 200, a difficult memory addressing scheme required for typical matrix operations. The figure shows a simple matrix-multiplication example, in which the rows of matrix A are applied element-wise with the columns of matrix B. In case the elements of both matrices would be written to consecutive address locations in the linear address space, each row in matrix A would be accessed using an address stride 1, and each column in matrix B using an address stride equal to the size of the row. Because the latter stride can be problematic in many memory systems, typically a so-called matrix-transpose operation is applied, which involves flipping the matrix values "over the matrix diagonal". As a result, a column can then be accessed using a stride-1 access pattern to produce the resulting matrix C. However, this comes at the cost of having to read and rewrite the entire matrix which can also consume a substantial amount of memory bandwidth and time.

Another example showing another application area for the proposed concept is shown at 300 in FIG. 3. It shows various stencils that can be applied on a 2-D or 3-D structure. It can be seen from the illustrations that accessing all elements covered by a single stencil would involve two respectively three different power-of-2 strides (for the 2-D and 3-D structures).

Despite that power-of-2 access patterns have been investigated for a long time, the issue of inefficient access has yet not been solved. One problem is that this kind of accesses often results in degraded memory performance due to the organization and standout address mapping used in many memory systems, which are often organized using a power-of-2 number of memory banks.

In special HPC (high performance computing) systems, sometimes fixed/hard-wired mappings may be applied that are based on performing a modulo operation against a prime number or similar approaches, which may be specific to a particular workload because these may be different or impossible to program, and therefore still can reside in worse-case/pathological cases. The latter mechanism also adds to the access latency.

Before moving to the next figure, the following thoughts about vector processing and access should be considered:

In order to access a data vector in parallel in n banks (i.e., the size of the data vector equals n*w with w being the width or access granularity of a single bank), the correct offsets have to be generated for each bank, resulting in a total of n offsets for each data vector. For example: if an 8-element data vector has to be accessed related to the address sequence 0, 1, 2, 3, 4, 5, 6 and 7 (stride 1) based on the mapping example 400 in FIG. 4, then the memory locations at the following offsets have to be accessed in the 8 respective memory banks: {0, 1, 2, 3, 4, 5, 6, 7}.

The shown table addresses the above-mentioned issue by defining a flexible and programmable address mapping scheme that can perfectly interleave between the power-of-2 strided access patterns to one data structure that is stored in a memory system comprised of multiple memory banks.

This mapping scheme is based on a small 2-D lookup table (not shown) that is indexed by two values extracted from the address that is to be mapped. One of the two index values is determined by calculating bitwise parity values of a selected address bits. However, the underlying concept does not need to be explained here. The figure should only show that for a perfectly interleave multiple power-of-2 access patterns, also a shuffling of the sequence of memory locations may be required.

The striped marked "mapped addresses" in FIG. 4 illustrates that data vectors with a size equal to the number of memory banks (in the example 8 data elements) related to aligned address sequences involving a power-of-2 stride are perfectly interleaved over all memory banks and can thus be accessed (i.e., read or write) as a single data vector by accessing all banks in parallel requiring exactly one access on each bank. For example, in FIG. 4, each block of aligned addresses involving a stride 1 (e.g., addresses 0, 1, 2, 3, 4, 5, 6, 7), a stride 2 (e.g., addresses 0, 2, 4, 6, 8, 10, 12, 14), a stride 4 (e.g., addresses 0, 4, 8, 12, 16, 20, 24, 28), a stride 8 (e.g., addresses 0, 8, 16, 24, 32, 40, 48, 56), a stride 16 (e.g., addresses 0, 16, 32, 48, 64, 80, 96, 112), a stride 32 (e.g., addresses 0, 32, 64, 96, 128, 160, 192, 224), and so on, can all be accessed in parallel. No re-access of a bank is required because the data elements to be accessed are equally distributed among the banks.

In case of a read operation, bank 0 will provide the first element of the data vector (mapped address 0), bank 1 the second (mapped address 1), and so on. Similarly, in case of a write operation, the elements of the data vector will be written in the sequential order to the respective banks. If instead an 8-element data vector is accessed related to the address sequence 0, 2, 4, 6, 8, 10, 12 and 14 (stride 2), then the following offsets have to be accessed in parallel in the 8 respective banks: {0, 8, 2, 10, 4, 12, 6, 14}. In this example, in case of a read operation, the first element of the data vector (mapped address 0) will be provided by bank 0, the second element (mapped address 2) will be provided by bank 2, the fifth element (mapped address 8) will be provided by bank 1, and so on. It will be clear that the data that is read from the banks must be shuffled to restore the desired data vector, which should contain the elements in order of their mapped addresses (0, 2, . . . , 14). Furthermore, when the data vector is written, the elements also must be shuffled to write each element correctly according to the way its corresponding address is mapped on the memory banks.

Dependent on the address sequence related to the elements of the data vectors, there can be a range of different orders in which the individual bank offsets need to be generated and in which the read and write data needs to be shuffled.

A brute force approach would be to generate the address for each element in the data vector independently of the other elements and to map it independently on a bank identifier and bank offset, which would result in a total of n address generation and address mapping functions. The output of the mapping functions (in particular the bank identifiers) could then be used to control two n-to-n shuffle units for write and reading the data vectors, which would allow to shuffle the elements of each data vector in any possible order.

However, the complexity of this approach, both, with respect to performance and area cost, increases rapidly with the value of n which basically limits the brute force approach to be applied to small values of n, for example 4 or 8.

Larger data vectors are very important, however, because these are instrumental to achieve the required efficiency and performance in the computation. This is stressed even more because of the wide data paths offered by newer memory technologies (e.g., HBM—high bandwidth memory).

For that purpose, the following innovations are covered:
1. vector-based offset generation for an entire data vector covering all banks in parallel;
2. efficient shuffling of the data vector elements for writing those into the memory banks;
3. efficient shuffling of the data vector elements after reading those from the memory banks;
4. selection of the address bits that are used to calculate each of the parity bits.

For the vector-based offset generation, the following observation can be made: for any data vector with n elements that relate to an aligned address sequence involving any power-of-2 stride, the difference between the n addresses are limited to $\log_2 n$ adjacent bit positions in the addresses and cover all n possible values of those $\log_2 n$ bit positions.

If the parity bits are extracted from the address in a bit-interleaved fashion, then the n addresses involved in any aligned address sequence with a power-of-2 stride will be mapped based on the bank identifiers specified in a single row in the lookup-table.

FIG. 5 shows an example 500 for a start address 'a' 502 for a data vector having 9 bit elements $a_0, a_1, \ldots, a_8$. The MSB (most significant bits) are used as a vector Y which will be needed later and which is of $\log_2(n)$ size (n=8). Bits $a_0, a_1, \ldots, a_5$ are AND-combined with mask vectors $m_0, m_1,$ and $m_2$ (($\log_2(n)$=3) resulting the $\log_2(n)$ vectors 504 on the right side of the figure. It may be noted that the mask vectors $m_0, m_1,$ and $m_2$ carry "0" in positions of the Y portion of the start address a 502.

For each of the vectors 504, a parity bit is calculated resulting in $X_0, X_1, X_2$; this may also be interpreted as applying XOR functions. $X_0, X_1, X_2$ are treated as dimensions of an X vector. Then, a bit-level XOR function is applied to X and Y resulting in a vector Z of the same size or dimension ($\log_2(n)$).

For this, FIG. 6 shows, at 600, a next step in determining the offsets for the memory banks in the memory unit.

It may be noted that the mapping table have the property that the value that is stored related to a given combination of the X and Y values equals the XOR product of those X and Y values. This results again in the following property: if a bank identifier i occurs in column j of a given row, then the bank identifier j occurs in column i of that row as well (those values can be denoted as swapped).

For example, the row corresponding to Y=6 in the mapping table 602 comprises a bank identifier 7 in column 1 (corresponding to X=1). The same row now comprises a bank identifier 1 in column 7 (X=7). These two locations will be called a pair of "swap" locations. Because of the above "swap" property, if the parity values extracted from the n addresses would be in the same order as the values of the $\log_2(n)$ adjacent bit positions at which the n addresses are different, then bank offsets can directly be taken from the lookup table row, as will now be illustrated.

The binary equivalent of vector Z will be used as row index to the mapping table 602. Each binary value of the row of the mapping table 602 will be used at a defined position replacing $\log 2(n)$ bits of the start address. This is illustrated in the lower part of FIG. 6. In the address a (compare 502/FIG. 5; portion a0, a1, . . . , a5) the $\log_2(n)$ bits starting at bit offset 3 will be replaced by the binary equivalent of a respective row entry; e.g., "3" gives 011 (binary) as can be seen on the lower left part of FIG. 6. This principle is applied to each element in the selected row of the mapping table. It may be noted that for comprehensibility reasons only the first two and the eighth address/row-entry combinations are shown. At this point the offset values for the individual banks have been determined.

It may also be noted that in case of an 8 bit example, the mapping table—i.e., lookup table—requires only 8*8*3 bits=24 bytes. A lookup of entries in such a tiny table represents only a neglectable requirement for the tremendous advantages the proposed method represents.

In a next step—compare FIG. 7—a shuffling of the entries in the memory banks need to be determined. This needs a recall of the Z vector. Due to the fact that Z is a binary vector, the elements of the Z vector are either "0" or "1". Thus, the swap control, controlled by the bits of vector Z, is defined as follows: bit=1 means swap of a pair of entries in the start address; bit=0 means "no swapping".

This is shown as downward arrows (no swap) in FIG. 7 or crossed arrows (swapping) which is applied in a sequence of $\log_2(n)$ steps, one after the other starting with the LSB (least significant bit) of the Z vector as illustrated in FIG. 6.

This may now be illustrated in an example 800 of 8 banks representing the memory unit 802 in FIG. 8. For example, an address sequence 64, 65, 66, 67, 68, 69, 70, and 71 (involving a stride 1) involves a Y value equal to 1, and will therefore be mapped according to row 1 (Y=1) in the mapping table 804: address 64 will be mapped (compare 808) on bank 1 (compare 806), address 65 on bank 0, address 66 on bank 3, address 67 on bank 2, address 68 on bank 5, address 69 on bank 4, address 70 on bank 7, and address 71 on bank 6. The respective offsets equal the 6 least significant address bits which are: 0, 1, 2, 3, 4, 5, 6, and 7. The $\log_2 8$=3 bit positions, at which these eight addresses are different (as discussed above), are located at address bit positions 0, 1 and 2, which also equal the 3 least significant bits of the bank offsets. For the previous eight offsets the values at those bit positions equal 0, 1, 2, 3, 4, 5, 6, and 7 (these equal the offset values because the other offset bits happen to be zero in this example). Because of the way that the lookup table contents are generated, the value of these differing $\log_2(n)$ bit positions will equal the value of the parity bits.

Based on the above "swap" property of the lookup table contents, it can be derived that if an address is to be mapped on a particular bank identifier based on the corresponding lookup table element, that the swap location corresponding to that element will contain the value of the parity bits for that same address which is equal to the value of the differing $\log_2(n)$ bit positions. This implies that an offset vector can be generated by determining the Y value for the first address in an aligned address sequence, and then obtain n copies of the offset taken from that first address (by taking the least significant part, as described above), by substituting the respective row values corresponding to the Y value for the first address in the sequence, at the differing $\log_2(n)$ bit positions.

This property applies to any aligned sequence of n addresses involving any power-of-2 stride. It is not limited to power-of-2 strides for which the n differing bit positions—as discussed above—cover the bits of the X field in an "aligned" way (i.e., "start" with bit position X0, followed by position X1, and so on). This is because the values of any n consecutive bit positions will always result in indexing different entries in the same table row.

The notable implication is that, based on this property, the values of the n bank offsets can directly be retrieved by substituting the values from the row indexed by the Y value derived from address 'a', into the offset value derived from address a at the n bit positions corresponding to the log 2 value of the power-of-2 stride. This is depicted in the flow chart in FIG. 11 showing the steps for efficiently generating the offsets for all banks by applying the following steps: 1) map only the first address of the address sequence, i.e., calculate parity, derive Y value, derive offset 2) perform one table lookup corresponding to Y, 3) perform a parallel shift and bitwise OR function to obtain the actual bank offsets.

Before turning to the flowcharts, two additional examples of a mapping may be given. FIG. 9 shows as example 900 as vector start address 256, stride 1 (addresses 256, 257, 258, . . . , 263). Because 256 equals 100000000b, the Y, X and Z vectors can be determined to be Y=100b, X=000b, Z=100b, so that row 4 (100b) in mapping table (compare 602, FIG. 6) equals: 4 5 6 7 0 1 2 3. Hence, the bank offsets are: 4, 5, 6, 7, 0, 1, 2, 3 (respectively, for bank 0-7). The data vector shuffling with Z=100b implies that the first four entries are swapped with the second four entries.

FIG. 10 shows as example 1000 as vector start address 3, stride 8 (thus, addresses 3, 11, 19, . . . , 59). Because the start address=3=000000011b gets Y=000b, X=011b, Z=011b. Row 3 (011b) in mapping table 602 equals: 3 2 1 0 7 6 5 4. Hence, the bank offsets can be determined as: 27(011011b), 19(010011b), 11, 3, 59, 51, 43, 35 (respectively, for bank 0-7).

The data vector shuffling portion is determined by: Z=011b implies that each pair of adjacent entries is first swapped in a first step, followed by the swapping of the first block of two entries with the second, and the third block of two entries with the fourth. The results are shown in FIG. 8 with stipes marks beside the respective bank entries.

FIG. 11 shows a flowchart 1100 of an access offset generation for a read process in a more implementation near form if compared to FIG. 1.

In a nutshell—details will be explained also further down—the flow of actions is performed as follows: firstly, the address 'a' is obtained, 1102. Then, the parity, the Y field and an initial offset for the address 'a' is derived, 1104. A base offset is obtained, 1106, for all banks by accessing a row in the mapping table-based on the Y field (or parity). Next, the base offset is shifted, 1108, for all banks to bit positions corresponding to the target power-of-2 stride. Finally, the initial offset is merged, 1110, which has been determined for the address 'a' with shifted base offsets obtained from the mapping table to obtain offsets for all memory banks.

This compact flowchart representation will be discussed again in the following paragraphs:

Efficient shuffling of the data vector elements for writing those into the memory banks of the addresses in an address sequence could be mapped in any possible way over n memory banks, then there would be a total of n! possibilities in which the corresponding write data have to be shuffled in order to write each data element into the correct bank. For larger values of n, this increases rapidly and would require very large n-to-n shuffle units.

For the mapping schemes discussed above, however, the shuffling can be simplified substantially. This will now be illustrated using the above example mapping schemes.

The following assumes that the parity values (i.e., X) are identically ordered as the offset values. This is the case if the least significant differing address bit is covered by the least significant parity (X) bit, the second differing address bit by the next parity bit, and so on. How this constraint can be met for arbitrary power-of-2 strided accesses will be described further below in the paragraph covering the address/parity bit selection.

Because of the way in which the mapping tables are initiated ("swapping" property), the shuffling is determined by a single row in the lookup table, similar as with the generation of the bank offset vector. An interesting property of the mapping can directly be seen from the mapping table in FIG. 6: each row in the mapping table can be derived from the first row (corresponding to Y=0) by swapping the row elements in an "aligned way", using blocks covering k consecutive row elements, where k is a power-of-2 with a value ranging from 2 to the row size n/2.

For example in FIG. 6, the row corresponding to Y=1 can be derived from the first row corresponding to Y=0 by identifying four blocks with 2 elements each, {0, 1}, {2, 3}, {4, 5}, {6, 7} and swap all elements in each block. The next row corresponding to Y=2 can be derived by first identifying two blocks with 4 elements each, {0, 1, 2, 3} and {4, 5, 6, 7}, and then identify two blocks with a size of 2 elements in each of those blocks {0, 1} and {2, 3} respectively {4, 5} and {6, 7}, and swapping each of those two 2-element blocks within a 4-element block. It can be seen in FIG. 6 that all remaining rows can be derived from the first row by swapping at the level of 4-element blocks, or at the level of 2-element blocks within a 4-element block, of by combinations of both.

Another important property that can be seen from the examples in FIGS. 6 and 8 is that the most significant bit of the Z vector, can be used to determine if swapping operations need to be performed at the level of the largest block size for that mapping table, the next Z vector bit can be used to determine this for the level of the second-largest block size, and so on.

Because of the "swap" property, the above-discussed properties can now directly be used for shuffling the write data using the same block swapping concept in the following way: 1) the Z value is determined for the start address of a sequence of n addresses (as described above), 2) if the most significant Z value bit is set, then the n write data elements are swapped at the level of the largest block size being n/2, 3) if the next significant Z value bit is set, then the n write data elements are swapped at the level of the next block size being n/4, 4) and so on. This is illustrated by the chart in FIG. 12. For a memory system with 4, 8 or 16 banks, this means that only 2, 3, respectively 4 different 2-way shuffle functions are required, which is an enormous simplification compared to a full n-to-n shuffle unit.

Consequently, and also in a nutshell, the write operation can be summarized in the flowchart 1200 of FIG. 12. Firstly, the address 'a' is obtained, 1202. At step 1204 to parity and the Z field are derived. Next, right data elements are shuffled, 1206, at a granularity of n/2 block size based on the Z field bit position $(\log_2(n))-1$. At step 1208 the same happens again, however, with a granularity of n/4 block size based on the Z field position $(\log_2(n))-2$, and so on. This process is repeated—indicated by the dashed arrows— answer step 1210: shuffling of the right data elements at a granularity of 2 block size based on the Z field bit position 0.

The essential characteristics of the new shuffle function are

1. It can be implemented using only $\log_2(n)$ shuffle functions, each only shuffling 2 inputs (each requiring at most n*w 2-input multiplexers, with w being the width of each data element).
2. Each shuffle function is controlled by one bit of the Z vector or the parity function (which are each $\log_2(n)$ bits wide).

If individual write enable signals are used for each write data element, then those write enable signals need to be shuffled in the same way, in order to apply the correct write signal with each write data element.

3. Efficient shuffling of the data vector elements after reading those from the memory banks: Because of the "swap" properties of the previously discussed mapping schemes, the same shuffle concept can be used for shuffling the read data, as was described above for the write data.

If chip area or FPGA resources are very limited, it is also possible to use one set of $\log_2(n)$ shufflers for memory ports that are used for either reading or writing of data. Obviously, this will require an input multiplexer before the shuffle stages in order to select between the read or write data elements that have to be shuffled.

4. Selection of the address bits that are used to calculate each of the parity bits: As indicated before, the write and read data shuffling concepts above assume that the parity values (X) are identically ordered as the offset values. This requires that the least significant differing address bit in an aligned address sequence is covered by the least significant parity (X) bit, the second differing address bit by the next parity bit, and so on.

An example for which this does not apply, would be an address sequence 0, 2, 4, 6, 8, 10, 12, and 14 involving a stride 2, for the mapping scheme illustrated in FIG. 8. In this case the $\log_2(n)=\log_2 8=3$ differing bit positions between the eight addresses are bit positions 1, 2, and 3. Because those bit positions do not correspond to the X bit positions in the same order, the resulting X values are not ordered in the same way as the addresses: X=0 for address 0, X=2 for address 2, X=4 for address 4, X=6 for address 6, X=1 for address 8, X=3 for address 10, X=5 for address 12, and X=7 for address 14. Although the addresses are perfectly interleaved over all memory banks without any conflict, the above simplified shuffle operations are not sufficient.

This can be resolved by either 1) adding extra shuffle layers or by 2) applying a different selection of the address bits that are used to generate the parity vector X. The first option would require the addition of $(\log_2(n))-1$ extra layers because there can be $(\log_2(n))-1$ ways in which the $\log_2(n)$ differing bit positions in an address sequence with a power-of-2 stride are not aligned "with" the way in which the X field bits are generated. For the example in FIG. 8 this would therefore require $(\log_2(n))-1=1$ additional shuffle layer.

The second option would be to change the way in which the X bits are derived from the address.

In the above example, the position of the two X bits, X0 and X1 can be reversed to obtain the same results. Alternatively, the X bits can be derived only from address bit positions related to power-of-2 strides that are relevant. By doing this, the same write and read data shuffle concepts can be used as discussed above. This selection can be made by selecting the mask vector accordingly for each X bit position that is applied on the address to select the address bits over which the parity is calculated (a masked address bit gives zero which will not alter the XOR-based parity calculation).

Also, for this purpose, all other address bit positions not related to the differing bits in an aligned address sequence do not have to be part of the parity calculation (except for the table-less approach: all bits that are not part of the bank offset need to be covered by the parity calculation).

For completeness reasons, FIG. 13 shows a schematic block diagram of the memory access unit 1400 for accessing a binary data vector in a memory unit comprising a plurality of n memory banks, in which the binary data vector is stored in portions. The memory access unit 1400 comprises a receiving unit 1402 adapted for receiving a start address of the binary data vector and a power-of-2-stride s for the elements of the binary data vector.

The memory access unit 1400 comprises additionally a first determination module 1404 adapted for determining n offsets, one for each of the memory banks, wherein each one of the offsets is determined by applying a plurality of bit-level XOR functions to the start address resulting in a Z vector, using the Z vector for accessing a mapping table, and shifting mapping table access results according to a power-of-2-stride of the binary data vector.

The memory access unit 1400 also comprises a second determination module 1406 adapted for determining a sequence of portions of the binary data vector in the n memory banks depending on the binary equivalent value of the Z vector, and a basic access unit 1408 adapted for accessing the binary data vector in the n memory banks of the memory unit in parallel.

Embodiments of the invention may be implemented together with virtually any type of computer, regardless of the platform being suitable for storing and/or executing program code. FIG. 14 shows, as an example, a computing system 1500 suitable for executing program code related to the proposed method and/or into which the here proposed addressing schemes for memory units may be implemented.

The computing system 1500 is only one example of a suitable computer system, and is not intended to suggest any limitation as to the scope of use or functionality of embodiments of the invention described herein, regardless, whether the computer system 1500 is capable of being implemented and/or performing any of the functionality set forth hereinabove. In the computer system 1500, there are components, which are operational with numerous other general purpose or special purpose computing system environments or configurations. Examples of well-known computing systems, environments, and/or configurations that may be suitable for use with computer system/server 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1500 may be described in the general context of computer system-executable instructions, such as program modules, being executed by a computer system 1500. Generally, program modules may include routines, programs, objects, components, logic, data structures, and so on that perform particular tasks or implement particular abstract data types. Computer system/server 1500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1500 is shown in the form of a general-purpose computing device. The components of computer system/server 1500 may include, but are not limited to, one or more processors or processing units 1502, a system memory 1504, and a bus 1506 that couple various system components including system memory 1504 to the processor 1502. Bus 1506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1500 typically includes a variety of computer system readable media. Such media may be any available media that is accessible by computer system/server 1500, and it includes both, volatile and non-volatile media, removable and non-removable media.

The system memory 1504 may include computer system readable media in the form of volatile memory, such as random access memory (RAM) 1508 and/or cache memory 1510. Computer system/server 1500 may further include other removable/non-removable, volatile/non-volatile computer system storage media. By way of example only, a storage system 1512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, memory 1504 may include at least one program product having a set (e.g., at least one) of program modules that are configured to carry out the functions of embodiments of the invention.

The program/utility, having a set (at least one) of program modules 1516, may be stored in memory 1504 by way of example, and not limiting, as well as an operating system, one or more application programs, other program modules, and program data. Each of the operating systems, one or more application programs, other program modules, and program data or some combination thereof, may include an implementation of a networking environment. Program modules 1516 generally carry out the functions and/or methodologies of embodiments of the invention, as described herein.

The computer system/server 1500 may also communicate with one or more external devices 1518 such as a keyboard, a pointing device, a display 1520, etc.; one or more devices that enable a user to interact with computer system/server 1500; and/or any devices (e.g., network card, modem, etc.) that enable computer system/server 1500 to communicate with one or more other computing devices. Such communication can occur via Input/Output (I/O) interfaces 1514. Still yet, computer system/server 1500 may communicate with one or more networks such as a local area network (LAN), a general wide area network (WAN), and/or a public network (e.g., the Internet) via network adapter 1522. As depicted, network adapter 1522 may communicate with the other components of the computer system/server 1500 via bus 1506. It should be understood that, although not shown, other hardware and/or software components could be used in conjunction with computer system/server 1500. Examples, include, but are not limited to: microcode, device drivers, redundant processing units, external disk drive arrays, RAID systems, tape drives, and data archival storage systems, etc.

Additionally, the memory access unit 1400 for accessing a binary data vector in a memory unit comprising a plurality of n memory banks in which the binary data vector is stored in portions may be attached to the bus system 1506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized as
   a method for accessing a binary data vector in a memory unit comprising a plurality of n memory banks in which the binary data vector is stored in portions, the method comprising receiving a start address of the binary data vector and a power-of-2-stride s for elements of the binary data vector, determining n offsets, one for each of the memory banks, wherein each one of the offsets is determined by applying a plurality of bit-level XOR functions to the start address resulting in a Z vector, using the Z vector for accessing a mapping table, and shifting mapping table access results according to a power-of-2-stride of the binary data vector, and determining a sequence of portions of the binary data vector in the n memory banks depending on a binary equivalent value of the Z vector, and accessing the binary data vector in the n memory banks of the memory unit in parallel.

In the method, applying a plurality of bit-level XOR functions to the start address may comprise selecting from the start address $\log_2(n)$ portions and a Y portion of $\log_2(n)$ bit size, determining a parity bit for each of the log 2(n) portions resulting in a parity vector X of $\log_2(n)$ dimensions, and performing bit-level XOR operations between X and Y resulting in a Z vector.

Using the Z vector for accessing a mapping table may comprise selecting a row in the mapping table comprising $\log_2(s)$ entries by using the Z vector as index in the mapping table, and combining the mapping table access results with a portion of the start address to obtain the n offsets.

The combining may comprise replacing $\log_2(n)$ bits located at bit offset $\log_2(n)$ of the start address by the determined $\log_2(n)$ mapping table entries resulting in $\log_2(n)$ offsets, each one being used as offset in a respective one of the $\log_2(n)$ banks.

The determining of the sequence of portions of the binary data vector in the n memory banks may comprise controlling $\log_2(n)$ consecutive multiplexer stages, each of which may comprise a plurality of 2-input-bit-multiplexers so as to cover the total width of the data vector.

The access operation may be a read operation.

The access operation may be a write operation.

The selected $\log_2(n)$ portions of the start address may be equally sized.

The binary data vector may be stored in equally sized portions in the plurality of the n memory banks.

The providing of the start address, the determining of the offsets, and the determining of a sequence of portions of the binary data vector and the determining of a sequence of portions may be performed before the write operation of the binary data vector to the n memory banks.

Providing the start address, the determining the offsets, and the determining a sequence of portions of the binary data vector may be performed before the read operation of the binary data vector to the n memory banks, and determining a sequence of portions may be performed after the read operation of the binary data vector to the n memory banks.

A memory access unit for accessing a binary data vector in a memory unit comprises a plurality of n memory banks in which the binary data vector is stored in portions, the memory access unit comprising a receiving unit adapted for receiving a start address of the binary data vector and a power-of-2-stride s for the elements of the binary data vector, first determination module adapted for determining n offsets, one for each of the memory banks, wherein each one of the offsets is determined by applying a plurality of bit-level XOR functions to the start address resulting in a Z vector, using the Z vector for accessing a mapping table, and shifting mapping table access results according to a power-of-2-stride of the binary data vector, and a second determination module adapted for determining a sequence of portions of the binary data vector in the n memory banks depending on the binary equivalent value of the Z vector, and a basic access unit adapted for accessing the binary data vector in the n memory banks of the memory unit in parallel.

Applying a plurality of bit-level XOR functions to the start address by the first determination module may comprise selecting from the start address $\log_2(n)$ portions and a Y portion of $\log_2(n)$ bit size, determining a parity bit for each of the $\log_2(n)$ portions resulting in a parity vector X of $\log_2(n)$ dimensions, and performing bit-level XOR operations between X and Y resulting in a Z vector.

Using the Z vector for accessing a mapping table by the first determination module may comprise selecting a row in the mapping table comprising $\log_2(s)$ entries by using the Z vector as index in the mapping table, and combining the mapping table access results with a portion of the start address to obtain the n offsets.

Combining of the first determination module may also comprise replacing $\log_2(n)$ bits located at bit offset $\log_2(n)$ of the start address by the determined log 2(n) mapping table entries resulting in $\log_2(n)$ offsets, each one being used as offset in a respective one of the $\log_2(n)$ banks.

The second determination module may also be adapted for: when the determining the sequence of portions of the binary data vector in the n memory banks, controlling $\log_2(n)$ consecutive multiplexer stages, each of which comprises a plurality of 2-input-bit-multiplexers so as to cover the total width of the data vector.

The access operation may be a read operation.

The access operation may be a write operation.

The selected $\log_2(n)$ portions of the start address may be equally sized.

The binary data vector may be stored in equally sized portions in the plurality of the n memory banks.

Providing the start address, the determining the offsets, and the determining of a sequence of portions of the binary data vector, and the determining of a sequence of portions, may be performed before the write operation of the binary data vector to the n memory banks.

Providing the start address, the determining of the offsets, and the determining of a sequence of portions of the binary data vector may be performed before the read operation of the binary data vector to the n memory banks, and determining a sequence of portions may be performed after the read operation of the binary data vector to the n memory banks.

A computer program product accessing a data vector in a memory component comprising a plurality of n memory banks in which the binary data vector is stored in portions, the computer program product comprising a computer readable storage medium having program instructions embodied therewith, the program instructions being executable by one or more computing systems or controllers to cause the one or more computing systems to receive a start address of the binary data vector and a power-of-2-stride s for the elements of the binary data vector, determine n offsets, one for each of the memory banks, wherein each one of the offsets is determined by apply a plurality of bit-level XOR functions to the start address resulting in a Z vector, use the Z vector for accessing a mapping table, and shift mapping table access results according to a power-of-2-stride of the binary data vector, and determine a sequence of portions of the binary data vector in the n memory banks depending on the binary equivalent value of the Z vector, and access the binary data vector in the n memory banks of the memory unit in parallel.

What is claimed is:

1. A method for accessing a binary data vector in a memory unit comprising a plurality of n memory banks in which said binary data vector is stored in portions, said method comprising receiving a start address of said binary data vector and a power-of-2-stride s for elements of said binary data vector, determining n offsets, one for each of said memory banks, wherein each one of said offsets is determined by applying a plurality of bit-level XOR functions to said start address resulting in a Z vector, using said Z vector for accessing a mapping table, and shifting mapping table access results according to a power-of-2-stride of the binary data vector, and determining, by shuffling write data to obtain a first data vector of the binary data vector and by shuffling read data to obtain a second data vector of the binary data vector, a sequence of portions of the binary data vector in the n memory banks depending on a binary equivalent value of the Z vector, and accessing the sequence of the portions of the binary data vector in the n memory banks of said memory unit in parallel.

2. The method according to claim 1, wherein said applying a plurality of bit-level XOR functions to said start address comprises selecting from said start address $\log_2(n)$ portions and a Y portion of $\log_2(n)$ bit size, determining a parity bit for each of said $\log 2(n)$ portions resulting in a parity vector X of $\log_2(n)$ dimensions, and performing bit-level XOR operations between X and Y resulting in a Z vector.

3. The method according to claim 2, wherein using said Z vector for accessing a mapping table also comprises selecting a row in said mapping table comprising $\log_2(s)$ entries by using said Z vector as index in said mapping table, and combining said mapping table access results with a portion of said start address to obtain said n offsets.

4. The method according to claim 3, wherein said combining comprises replacing $\log_2(n)$ bits located at bit offset $\log_2(n)$ of said start address by said determined $\log_2(n)$ mapping table entries resulting in $\log_2(n)$ offsets, each one being used as offset in a respective one of said $\log_2(n)$ banks.

5. The method according to claim 1, wherein said determining said sequence of portions of said binary data vector in said n memory banks comprises controlling $\log_2(n)$ consecutive multiplexer stages, each of which comprise a plurality of 2-input-bit-multiplexers so as to cover a total width of said binary data vector.

6. The method according to claim 1, wherein said accessing of the binary data vector is a read operation.

7. The method according to claim 6, wherein said providing said start address, said determining said offsets, and said determining a sequence of portions of said binary data vector is performed before said read operation of said binary data vector to said n memory banks, and wherein said determining a sequence of portions is performed after said read operation of said binary data vector to said n memory banks.

8. The method according to claim 1, wherein said accessing of the binary data vector is a write operation.

9. The method according to claim 8, wherein said providing said start address, said determining said offsets, and said determining a sequence of portions of said binary data vector and said determining a sequence of portions is performed before said write operation of said binary data vector to said n memory banks.

10. The method according to claim 1, wherein selected $\log_2(n)$ portions of said start address are equally sized.

11. The method according to claim 1, wherein said binary data vector is stored in equally sized portions in said plurality of said n memory banks.

12. A memory access unit for accessing a binary data vector in a memory unit comprising a plurality of n memory banks in which said binary data vector is stored in portions, said memory access unit comprising a receiving unit adapted for receiving a start address of said binary data vector and a power-of-2-stride s for elements of said binary data vector, a first determination module adapted for determining n offsets, one for each of said memory banks, wherein each one of said offsets is determined by applying a plurality of bit-level XOR functions to said start address resulting in a Z vector, using said Z vector for accessing a mapping table, shifting mapping table access results according to a power-of-2-stride of said binary data vector, and shuffling write data to obtain a first data vector of the binary data vector and shuffling read data to obtain a second data vector of the binary data vector, and a second determination module adapted for determining a sequence of portions of said binary data vector in said n memory banks depending on a binary equivalent value of said Z vector, and a basic access unit adapted for accessing said sequence of said portions of said binary data vector in said n memory banks of said memory unit in parallel.

13. The memory access unit according to claim 12, wherein said applying a plurality of bit-level XOR functions to said start address by said first determination module comprises selecting from said start address $\log_2(n)$ portions and a Y portion of $\log_2(n)$ bit size, determining a parity bit for each of said $\log_2(n)$ portions resulting in a parity vector X of $\log_2(n)$ dimensions, and performing bit-level XOR operations between X and Y resulting in a Z vector.

14. The memory access unit according to claim 13, wherein using said Z vector for accessing a mapping table by said first determination module also comprises selecting a row in said mapping table comprising $\log_2(s)$ entries by using said Z vector as index in said mapping table, and combining said mapping table access results with a portion of said start address to obtain said n offsets.

15. The memory access unit according to claim 14, wherein said combining of said first determination module also comprises replacing $\log_2(n)$ bits located at bit offset $\log_2(n)$ of said start address by said determined $\log 2(n)$ mapping table entries resulting in $\log_2(n)$ offsets, each one being used as offset in a respective one of said $\log_2(n)$ banks.

16. The memory access unit according to claim 12, wherein said second determination module is also adapted for:

when said determining said sequence of portions of said binary data vector in said n memory banks, controlling $\log_2(n)$ consecutive multiplexer stages, each of which comprises a plurality of 2-input-bit-multiplexers so as to cover a total width of said binary data vector.

17. The memory access unit according to claim 12, wherein said accessing of said binary data vector is a read operation.

18. The memory access unit according to claim 17, wherein said providing said start address, said determining said offsets, and said determining a sequence of portions of said binary data vector is performed before said read operation of said binary data vector to said n memory banks, and wherein said determining a sequence of portions is performed after said read operation of said binary data vector to said n memory banks.

19. The memory access unit according to claim 12, wherein said accessing of said binary data vector is a write operation.

20. The memory access unit according to claim 19, wherein said providing said start address, said determining said offsets, and said determining a sequence of portions of said binary data vector, and said determining a sequence of portions, is performed before said write operation of said binary data vector to said n memory banks.

21. The memory access unit according to claim 12, wherein selected $\log_2(n)$ portions of said start address are equally sized.

22. The memory access unit according to claim 12, wherein said binary data vector is stored in equally sized portions in said plurality of said n memory banks.

23. A computer program product accessing a data vector in a memory component comprising a plurality of n memory banks in which said binary data vector is stored in portions, said computer program product comprising a computer readable storage medium having program instructions embodied therewith, said program instructions being executable by one or more computing systems or controllers to cause said one or more computing systems to receive a start address of said binary data vector and a power-of-2-stride s for elements of said binary data vector, determine n offsets, one for each of said memory banks, wherein each one of said offsets is determined by
apply a plurality of bit-level XOR functions to said start address resulting in a Z vector,
use said Z vector for accessing a mapping table, and
shift mapping table access results according to a power-of-2-stride of said binary data vector, and determine, by shuffling write data to obtain a first data vector of the binary data vector and by shuffling read data to obtain a second data vector of the binary data vector, a sequence of portions of said binary data vector in said n memory banks depending on a binary equivalent value of said Z vector, and access said sequence of said portions of said binary data vector in said n memory banks of said memory unit in parallel.

* * * * *